3,511,653
CONTRAST ENHANCEMENT OF OPTICAL
IMAGES
Alwyn Frederick Wiebe, Ridgefield, Conn., assignor to American Cyanamid Company, Stamford, Conn., a corporation of Maine
Filed July 1, 1966, Ser. No. 562,164
Int. Cl. G03c 5/04
U.S. Cl. 96—27                              3 Claims

ABSTRACT OF THE DISCLOSURE

A photographic film producing prints of enhanced contrast is obtained by providing, in superposed integral arrangement with a sensitized or exposed transparency, a photochromic layer which is characterized by a relatively high optical density but which forms areas of lower optical density by the bleaching action of light passing through an optical image formed on the transparency and which is preferably a mixture of 1',3',3'-trimethyl-6-nitro-spiro[2H-1-benzopyran-2,2'-indoline] and a haloalkylphosphonic acid.

---

Figure 1:
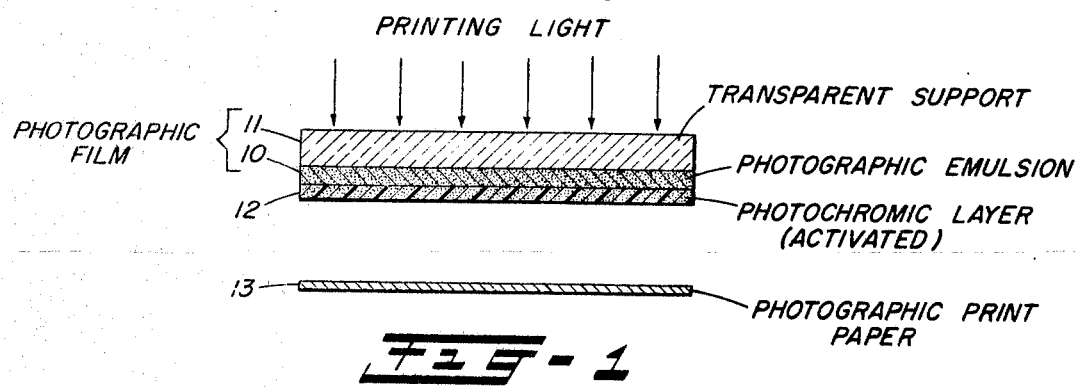

This invention relates to a method of enhancing the contrast of optical images produced from photographic film and to articles of manufacture useful therefor.

More particularly, this invention relates to an improved technique of photographic dodging and to modified photographic film having the built-in capability of providing, as desired, enhanced contrast in optical images produced therewith.

Various methods, materials and devices are known whereby the optical images produced by contact printing, projection, or like means, from photographic transparencies, whether negative or positive, are modified to provide more information. Such additional information is generated by attenuating, emphasizing or correcting the density scales or variations which are normally lost, de-emphasized, or over emphasized during printing or projection of the optical image from the transparency. The effect is to sharpen small detail or to soften the contrast of large detail. The techniques are generally termed "dodging" because portions of the printing or projection light are blocked, avoided or "dodged" in order to improve the resulting optical image.

Various problems are associated with conventional dodging techniques. For example, the procedure requiring opaque cutouts or the movement of an operator's hands in the printing light between a photographic transparency and a projection screen or printing paper is obviously inaccurate and unreliable. Another method requiring the use of an underexposed positive image mask in registration with the transparency during contacting printing or enlarging becomes time consuming since it is difficult to secure precise registration of the transparency and mask. Electron scanning devices are also employed for dodging; however, such instruments are expensive and often result in a halo effect in the image.

Recently, dodging techniques and materials have been developed involving the use of photochromic film. Such film is first activated, i.e., colored, by exposure to light of the proper activating wavelength through a transparency to produce a reversal masking image of the transparency in the photochromic film. Thereafter, the photochromic mask in register with the transparency is exposed to actinic light, generally white light, to produce a corrected positive print or projected image.

Certain improvements have been made in the technique of dodging with photochromic film. One such improvement is manufacture of unexposed negative film with a uniform photochromic layer in contact with the photographic emulsion or with the transparent support for the emulsion. By suitable choice of photographic film, particularly with respect to thickness of the film, uniform dodging may be obtained, when and if desired, without the problems of inaccurate register or disturbance of the negative film and photochromic mask. The technique also permits erasure of the masking image and reexposure of the photochromic layer to impart a new masking image, the ultimate benefit being greater flexibility of operation, particularly when operating with numerous pictures in a roll of film. The improved technique has the further convenience of permitting removal of the photochromic layer by peeling, dissolving, or like means.

While the foregoing techniques and articles utilizing photochromic film provide many advantages, at least one problem still persists. This is the difficulty of improving or enhancing the contrast of an optical image produced from a transparency containing photographic data very close in density. For example, in low light-level photography, such as exists in photographic missile tracking, the known photochromic film masking techniques are incapable of substantially improving the contrast.

An object, therefore, of the present invention is to provide a method and article useful for conveniently enhancing the contrast of optical images produced from low density-separation photographic transparencies.

This and other objects, features, and advantages of the invention will become further apparent from the description which follows.

Accordingly, it has been discovered that the contrast of optical images produced from photographic transparencies may be enhaned by providing an article of manufacture comprising in superposed integral arrangement photographic film and a photochromic layer which demonstrates decreased absorption when irradiated with suitable wavelengths of light. Generally stated, the method of the invention comprises directing through the composite of photographic film (in the form of a transparency) and photochromic layer, from the transparency side of the article, light of a wavelength effective to activate the photochromic layer.

"To activate" is intended herein to mean to change the characteristics of the photochromic film so as to transmit wavelengths of light which are visually or instrumentally distinguishable from the non-activated or ambient state of the material. Typically, the change in absorption on activation is decreased absorption evidenced by decreased optical density and the term "activated" or like term is intended herein to mean this state of decreased absorption or optical density. When photographic print paper is employed to receive the image, as in a contact print, the decreased absorption must occur in the actinic portion of the photographic spectrum (the region of the photographic spectrum to which a photographic emulsion is sensitive). The invention, however, is not limited to use of photochromic materials exhibiting changes in absorption characteristics in the photographic spectrum but includes the use of materials exhibiting changes in absorption detectable by spectral instruments including infrared detectors and the like.

The effect of activation is formation in the photochromic layer of a masking image of the same polarity as the transparency and in which the optical density is in direct proportion to the density of the transparency. When printing or projection light is passed through the composite of photochromic mask and photographic film transparency, the light is "dodged" to give an image in which the high and medium density or gray areas are substantially more dense or darker. The result is a projected image or photo print paper image of greatly enhanced contrast which is therefore capable of providing more information.

By "photochromic layer" is meant any of the numerous known or commercially available materials comprising a photochromic material, compound or mixture of compounds, uniformly distributed or dispersed in or over a substantially transparent support material. The photochromic materials exhibit a reversible change in absorption spectrum upon irradiation with specific wavelengths of light. Of particular interest in the present invention are photochromic materials, organic or inorganic, which display on activation decreased absorption in the visible when exposed to blue light and in which the original absorption characteristics are restored by exposure of the activated material to white or ultraviolet light. In some cases full restoration of the original absorption characteristics is possible and in others partial restoration is achieved as evidenced by loss of intensity or bleaching of the color of the activated state. Deactivation often may also be effected by removal of the activating wavelengths or, sometimes, by heating the photochromic material.

Among the great variety of photochromic compounds, both organic and inorganic, may be mentioned those described in Advances in Photochemistry, Interscience Publishers (1963), pp. 280–321. Techniques for incorporating photochromic compounds in or on transparent support materials are also well known. One such technique involves the evaporation of solvent from a film-forming resin containing a photochromic compound. The resins include any of the optical quality thermoplastic resinous materials such as polymethyl methacrylate, polyethyl methacrylate, polybutyl methacrylate, polystyrene, polyvinyl chloride, polyvinyl acetate, cellulose acetate, and cellulose acetate butyrate. These organic film-forming materials may be employed as monomers, as partially polymerized materials or as polymers. From about 0.01 to 20%, preferably 0.1 to 10%, by weight of the photochromic compound in the organic film-forming carrier is generally suitable. Particular compositions of these types and techniques for affixing the photochromic layer to a transparent sheet, applicable herein, are known in the art.

The thickness of the photochromic layer may vary depending upon the choice of photochromic material and method of applying the photochromic layer to the photographic emulsion or directly to the support sheet. Generally, a thickness of from about 0.1 to 5 mils and preferably from about 0.3 to 1.2 mils will be suitable. Greater thicknesses may result in a tendency of the composite of photographic film and photochromic layer to crease or crack or excessive actinic light refraction when producing the positive prints or images. Too thin layers, on the other hand, may result in a nonuniform photochromic layer or insufficient concentration of photochromic compound to provide efficient dodging.

The thickness of the photographic emulsion is not critical and will be in the range generally consider useful in the art, e.g., from about 0.3 to 0.5 mil.

Particularly preferred photochromic film is a thermoplastic polymer containing about 0.01–20% by weight of 1',3',3' - trimethyl - 6 - nitro - spiro[2H - 1 - benzopyran-2,2'-indoline] and about 0.1–10 equivalents of a haloalkyl phosphonic acid. The polymers include homopolymers and copolymers of ethylenically unsaturated monomers such as the alkyl acrylates, alkyl methacrylates, vinyl halides, vinylidene halides, vinyl acetates, alphaolefins, acrylonitrile, allyl compounds, and the like. Representative polymers and copolymers are poly(methyl methacrylate), acrylonitrile-butadiene-styrene copolymer, polyethylene, polystyrene, polyacrylonitrile, cellulose acetate butyrate, poly(ethyl acrylate), polypropylene, polyvinylchloride, and the like.

The haloalkyl phosphonic acids have the structure

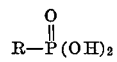

where R is a halogenated alkyl group ($C_1$–$C_4$). Typical of these acids are chloromethyl phosphonic acid, (2-chloroethyl)phosphonic acid, (3-chloropropyl)phosphonic acid, (4-chlorobutyl)phosphonic acid, (2-iodopropyl)phosphonicacid, (2-fluorobutyl)phosphonic acid, (bromomethyl)phosphonic acid, (dichloromethyl)phosphonic acid, (1,2-dichloroethyl)phosphonic acid, (2,3-dibromopropyl) phosphonic acid, (1,4-diiodobutyl)phosphonic acid, (2,4-difluorobutyl)phosphonic acid, (1,2,3-trichloropropyl) phosphonic acid, (trichloromethyl)phosphonic acid, and the like.

Photochromic films containing the foregoing spiropyrans and phosphonic acids are further detailed with preparation in U.S. Pat. No. 3,322,678.

Figure 2:
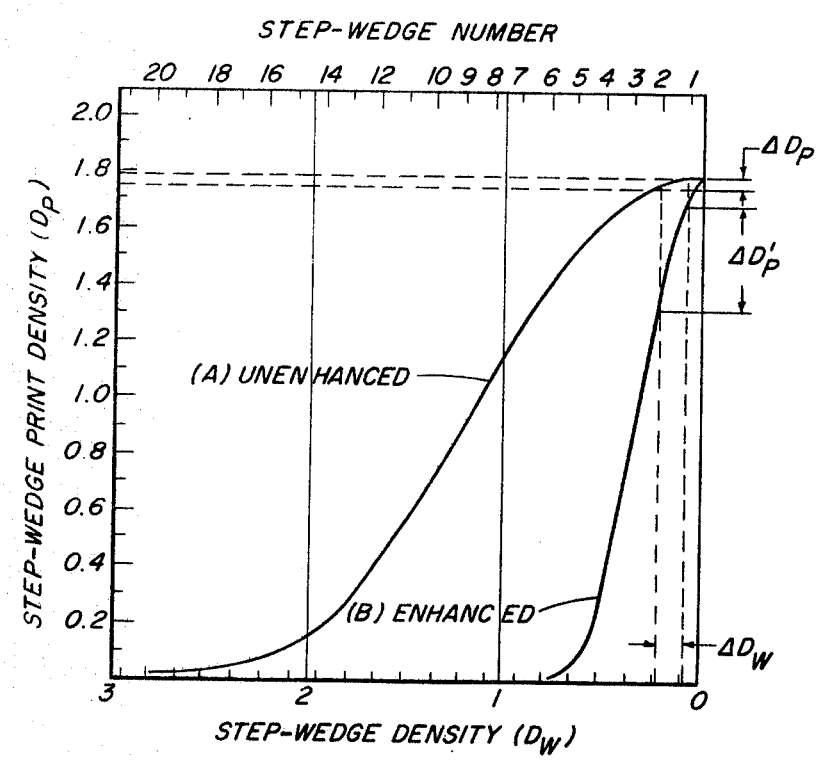

The invention is illustrated in the attached drawing in which FIG. 1 shows in cross-section an embodiment of an article of the invention and FIG. 2 is a conventional D-Log E graph comparing the contrast enhancement of positive prints made from a step wedge negative transparency with [curve (B)] and without [curve (A)] an activated photochromic layer.

With reference to FIG. 1, 10, is a photographic emulsion carried on transparent support 11. The combination of 10 and 11 is a conventional photographic film which may be unexposed or exposed. If exposed, it may be a negative or positive transparency. Transparent support 11 commonly is optical quality cellulose acetate, glass, or similar material. Photochromic layer 12 is shown in register with the emulsion side of the photographic film. Element 13 is conventional positive photographic print paper with emulsion side oriented towards the composite of photochromic layer and photographic film.

The arrangement of photographic film, photochromic layer and photographic print paper shown in FIG. 1 is useful for projection printing. When contact prints are desired the preferred orientation is photographic emulsion 10 in contact with photo print paper 13, with transparent support 11 on emulsion 10 and photochromic layer 12 over said emulsion.

As already described, the preferred photochromic layer comprises a thermoplastic film, 0.1 to 5.0 mils in thickness, containing uniformly dispersed throughout a mixture of a spiropyran compound and a haloalkyl phosphonic acid. The invention, however, includes numerous other types of photochromic layers and configurations of composites comprising such layers and photographic film. Among these may be mentioned:

(1) Photochromic layer comprising a transparent support, plastic or siliceous, uniformly coated with a photochromic material, organic or inorganic. The photochromic material may be in contact with the emulsion or support side of the photographic film or the transparent support of the photochromic layer may be in contact with the emulsion or support side of the photographic film.

(2) The several configurations of the invention, including (1), may be oriented towards a projection surface or positive photographic print paper 13 as desired, with photochromic material or photographic film facing the emulsion of the photo print paper, or with the support of either the photochromic material or photographic film facing the emulsion of the photo print paper.

(3) The photographic film may be developed or undeveloped. If developed, it may carry an optical image, positive or negative (positive or negative transparency). If undeveloped, photochromic material will be employed which will not decompose or be removed during the exposure and development of the film.

When the photochromic layer comprises a support coated with a photochromic material, the preferred configuration for contact printing is photochromic material in contact with the support side of the photographic film, and photographic emulsion in contact with the emulsion of the photo print paper.

The composite of photochromic layer and photographic film are in superposed integral arrangement, i.e., in laminate or sandwich arrangement with the photochromic layer and uniformly, permanently or semi-permanently affixed to the photographic film to provide the good register required for contrast enhancement over the entire photographic transparency. Within the scope of the invention also are composites wherein the photochromic layer may be removed from the photographic layer by peeling, stripping or dissolving when it has served its purpose.

The following examples, in which all parts and percentages are by weight unless otherwise specified, are provided for purpose of illustration only and are not intended as limitations on the invention except as set forth in the claims.

EXAMPLE 1

To 100 parts of poly(methyl methacrylate) in a 20% solution of methyl ethyl ketone/methyl isobutyl ketone mixture (80/20) are added 5.0 parts of 1',3',3'-trimethyl-6-nitro-spiro[2H-1-benzopyran-2,2'-indoline] and 2.25 parts of chloromethyl phosphonic acid. The resultant mixture is then drawn down on a ⅛ inch sheet of glass and allowed to set to a film 0.5 mil thick by evaporation of the solvent at room temperature.

The resulting film, transparent and yellow in color, when irradiated with blue light changes to a pale yellow color. The color change is a manifestation of a substantial reduction in the optical density of the material in the actinic portion of the spectrum. The film is then affixed with a commercially available adhesive to the emulsion side of a photographic negative transparency. The transparency contains areas of small negative density differences, i.e., areas which on a positive print exhibit grayness and generally poor contrast. The composite of activated photochromic film and negative transparency is then exposed, from the transparency side, to blue light for time sufficient to activate to a pale yellow the areas in the photochromic film corresponding to the areas of low negative density in the transparency. The photochromic film thus becomes a mask. When a positive image is printed or projected by passing white light through the masked composite, the areas in the positive image which normally would have printed gray are now darker. Thus the contrast in the positive image is enhanced by increased density separation in areas of normally close density with the result of increasing the information capabilities of the transparency.

EXAMPLE 2

A photochromic film is prepared substantially as described in Example 1 except for the incorporation of methyl mercury dithizonate as the photochromic agent in place of the mixture of indoline compound and chloromethyl phosphonic acid. The resulting film is transparent and yellow in color in the non-activated state but turns deep-blue black then irradiated with blue light. The non-activated film is then affixed with adhesive to the emulsion side of a photographic negative transparency of low density difference and irradiated with blue light through the negative. The result is a masked negative which when printed provides a positive image of greatly improved contrast.

EXAMPLE 3

To illustrate further the contrast enhancement capabilities of the invention, densiometric (D-Log E) curves are derived by use of a neutral density transmission filter ("step-wedge") in which the density is graded in 21 steps ("step-wedge numbers"), 0 to 20, wherein 0 represents zero density (appearing as white on a positive print) and 20 represents opacity (appearing as black on a positive print). The density difference between adjacent steps is the same along the step-wedge and the density range of the 21 steps is 3.0 density units.

Using the step-wedge as a negative transparency, a positive print is formed on grade 1 photographic print paper in the conventional manner. The positive print step-wedge densities ($D_p$) are then measured and plotted versus the densities ($D_w$) of the unprinted, negative, step-wedge. The resulting D-Log E curve (A) is shown in FIG. 2 of the drawing. The step-wedge numbers are also shown. This curve, particularly the slope (gamma), displays the transfer characteristics of the particular photographic printing paper employed.

The photochromic film described in Example 1 or 2 is then affixed with adhesive or tape to the step-wedge and the composite is exposed, through the step-wedge, to blue light to activate the photochromic film in inverse proportion to the density gradations of the step-wedge. A positive print is then made of the masked step-wedge on grade 1 photographic print paper and the step-densities of the positive measured and plotted as a D-Log E curve, shown as curve (B), in FIG. 2.

The greatly improved contrast by use of the photochromic film is obvious by comparing the step-wedge print density increments, $\Delta D_p$ and $\Delta D_p'$, of the curves corresponding to the same step-wedge density increment, $\Delta D_w$. Thus a marked density separation or contrast improvement is evident from curve (B) as compared to that of curve (A). Moreover, the curves show that the entire density range of the positive print paper is covered in about six steps in the enhanced print while requiring about 17 steps in the unenhanced print. Hence, by the technique of the invention, a negative transparency of relatively small density scale will be printed with considerably greater contrast. Further, it will be appreciated that the contrast afforded by higher grades of photographic print paper will be even further improved by the method described.

The article and method of the invention are useful in any photographic or optical recording application where it is desired to enhance the contrast of an unmodified optical image. For example, the invention is useful not only in providing more information from aerial photographs of normally poor density separation but also in enhancing the contrast of prints or projected images made from ground-to-air negatives as in missile tracking. Other fields of application include electron microscopy, radiography, diffraction patern analysis, and the like.

I claim:
1. A method of producing an optical image of enhanced contrast which comprises providing in superposed integral arrangement a transparent photographic film carrying an optical image and a photochromic layer of relatively high optical density but characterized by decreased absorption in its activated state, passing light of a wavelength effective to activate the photochromic layer first through the photographic film and then through the photochromic layer and thereby obtaining reductions in optical density throughout said layer in direct proportion to the amount of light passed by adjacent areas of the transparency, whereby a masking image of the same polarity as the transparency is formed, and then passing visible light through the resulting article.

2. The method of claim 1 wherein the photochromic layer is a thermoplastic film containing 1',3',3'-trimethyl-6-nitro-spiro[2H-1-benzopyran-2,2'-indoline] and a haloalkylphosphonic acid.

3. A method according to claim 1 in which the visible light directed through the article is white light.

References Cited

UNITED STATES PATENTS 3,160,504  12/1964  Montani _____ 96—90 XR
3,322,678  5/1967  Dorion et al. _____ 252—300

OTHER REFERENCES

The Photochromism of Metal Dithizonates, Merwether et al., J. A. C. S., 87 pp. 4441-4454, Oct. 20, 1965.

GEORGE F. LESMES, Primary Examiner

B. BETTIS, Assistant Examiner

U.S. Cl. X.R.

96—90, 44; 252—300